US006372807B1

(12) United States Patent
Székely

(10) Patent No.: US 6,372,807 B1
(45) Date of Patent: Apr. 16, 2002

(54) PROCESS FOR THE CONVERSION OF MIXED PLASTIC WASTE

(75) Inventor: Tamás Székely, Budapest (HU)

(73) Assignee: TVK Ecocenter KFT., Ozd (HU)

( * ) Notice: Subject to any disclaimer, the term of this patent is extended or adjusted under 35 U.S.C. 154(b) by 0 days.

(21) Appl. No.: 09/555,789

(22) PCT Filed: Dec. 4, 1998

(86) PCT No.: PCT/HU98/00100
§ 371 Date: Aug. 30, 2000
§ 102(e) Date: Aug. 30, 2000

(87) PCT Pub. No.: WO99/29481
PCT Pub. Date: Jun. 17, 1999

(30) Foreign Application Priority Data

Dec. 5, 1997 (HU) ............................................. P9702362

(51) Int. Cl.⁷ .......................... C08J 11/00; B29B 17/00; C10M 175/00; C10M 175/02
(52) U.S. Cl. ...................... 521/40.5; 521/46.5; 521/47; 524/502; 524/515
(58) Field of Search .............................. 521/40.5, 46.5, 521/47; 524/502, 515

(56) References Cited

U.S. PATENT DOCUMENTS 5,030,662 A * 7/1991 Banerjie .................... 521/43.5
5,076,988 A * 12/1991 Rifi ............................. 264/211
5,468,431 A * 11/1995 Heling ......................... 264/37

FOREIGN PATENT DOCUMENTS

| DE | 4311708 | | 11/1913 |
| DE | 3037829 A1 | * | 4/1982 |
| DE | 4311034 A1 | * | 10/1984 |
| DE | 4102237 | | 7/1992 |
| DE | 4434252 | | 3/1996 |
| DE | 231797 | | 11/1997 |
| DE | 19625110 | | 12/1997 |
| EP | A578500 | | 1/1994 |
| JP | 7205151 | | 8/1995 |
| WO | A9809997 | | 3/1998 |

* cited by examiner

Primary Examiner—Margaret Medley
(74) Attorney, Agent, or Firm—Birch, Stewart, Kolasch & Birch, LLP

(57) ABSTRACT

The invention relates to the conversion of a mixed plastic waste by means of mechanical treatment of the starting material mixture in the presence of a mineral oil. The essence of the invention consists therein that a crushed plastic waste mixture containing about 20% by weight of low density polyethylene with a softening point below 150° C. is heat-treated in an oily medium in an apparatus exerting intense kneading-moulding effect at a temperature between 150° C. and 250° C. under vigorous stirring until the formation of a quasi-homogenous, liquid-phase or melt-phase bitumen-like material, then separating the bitumen-like material obtained.

4 Claims, No Drawings

PROCESS FOR THE CONVERSION OF MIXED PLASTIC WASTE

This application is the national phase under 35 U.S.C. § 371 of PCT International Application No. PCT/HU98/00100 which has an International filing date of Dec. 4, 1998, which designated the United States of America.

The invention relates to a process for the conversion of mixed plastic waste to a homogeneous product which can be utilized in industry.

It is known that from end-products manufactured in large amounts, only a small proportion of plastics are recycled after use. The regeneration comprises mainly such plastic articles (e.g. bottles, cans etc.), which are easily recognized and thus easily separated from the waste to either re-utilize directly or to process them in the form of a re-granulated material after washing.

The re-utilization of mixed plastic waste is for the most part an unsolved problem. The main reason is that four or five types of plastics in general use that are prevalent in the waste that is selectively collected by the population, are available in many forms. Consequently they cannot be separated from the waste by a simple method and hence the appearance of the products is very diverse according to their type even before utilization and this becomes more complicated after wear.

The regeneration of simple packaging materials widely used in the trade is a relatively well-solved task. However, it is costly and an improvement in quality would be difficult to solve under market conditions.

Another problem seen during regeneration and re-utilization of plastic articles (products) is the result of aging during the period of their wear. Their physical-chemical state changes because of mechanical, thermal or other stresses and therefore, in comparison to the original ones, their color, mechanical and chemical properties are significantly changed depending on the amount of degradation.

An essential problem of the regeneration comprises that first during the wear and later during the waste processing, the plastics become contaminated by other materials (foreign materials) which are either incorporated into the waste or they remain adhered to the waste surface. The spectrum of these contaminants is extremely broad and extends from the remains of foods to oily and chemical residues, powder, metal residues etc., i.e. it is of organic or inorganic nature.

The main bulk of plastics alone or together with other waste is disposed or burnt.

A relatively simple manner of utilizing mixed plastic waste consists of granulating it after cleaning, and without a separation step, shaping it by melting together using known plastic processing techniques. In some fields the processed products are employed for the substitution of wood (fences, benches and the like), however, they can only be produced with a strong color and can be sold only within a limited scope. The quality of the regenerated product significantly depends on the composition of the raw material and therefore, the utilization of mixtures with a defined composition is not possible. Considering the heterogeneous state of such raw materials, the mechanical properties of the products cannot be foreseen or standardized. Thus, the production of "artificial wood" is only marginally important, and it cannot be considered to possibly play a large role in the utilization of plastic wastes.

DOS 2 311 797 describes a process for preparing solid articles, coatings, etc. based on heat resistant filling material and thermoplastic bounding material, which process comprises heating the heat resistant filling material to have a suitable particle size, at a temperature lower than the decomposition temperature of the thermoplasts, mechanically mixing additional thermoplasts with the heated filling materials, and if desired, a plasticizer is added, and finally shaping the mass in a hot state. This process relates to the production of second generation plastic articles which are suitable only for limited purposes.

In addition to the above difficulties, the re-granulation of plastic wastes without separation or moulding of final products directly from the melt is also problematic as it is known that the major part of the plastics do not constitute a compatible homogeneous mixture even in the molten state, and subsequently, the mechanical properties of the manufactured products are randomly formed. In order to solve this problem, EP 0 578 500 describes that high density polyethylene particles are suspended in a low density polyethylene matrix which are then moulded into plates. In spite of the considerable differences in apparent densities, the addition of mineral oil to the composite product prepared by moulding and other treatment does not become decomposed. This method is suitable only for processing of a mixture of two sorts of polyethylene and both the moulding as well as cooling should be carried out with the highest care for maintaining the cohesion.

It is desired to eliminate the heterogeneous state of the mixed plastic wastes containing similar plastic sorts mainly by a specific type of mechanical processing thereby making the product useful. For example, according to patent U.S. Pat. No. 5,468,431, the mingled mixture is divided into two parts in such a way that each part is homogeneous; then the specific surface of one material group is increased and then incorporated into the other material group used as a medium. The composite prepared in this way is quasi-homogeneous. However, this method is very sensitive towards the composition of the raw material and contaminants, and as such, it cannot be used without a previous selection step or pretreatment of the virgin material. Due to this circumstance the process is uneconomical.

U.S. Pat. No. 5,030,662 tried to solve the problem of the heterogeneous state of the mixture by means of reactive additives, however, the quality of products becomes much poorer than that of the virgin material. Hungarian patent HU 204,461, attempted to solve this problem by combining two steps. During the first operation, the mixed plastic waste is activated by a shear force of 500 to 5000 N within the range of softening temperature. The reactive sites formed at the molecular ends (broken by the decomposition) are polymerized by using a Ziegler type catalyst. The disadvantage of this process consists in that the organoaluminum compound is pyrophoric thereby making the process expensive. In addition, the catalyst is decomposed and made ineffective by contaminants, mainly through moisture of the mixed wastes.

A number of other known techniques for processing of plastics are disclosed in the introductory part of the Hungarian patent HU 204,461. The regeneration of mixed plastic waste for the original purpose is expensive and is substantially unsolved without a separation step of high selectivity.

A different way of utilizing mixed plastic wastes is to further modify a product of the mineral oil industry, i.e., prepare a raw material for the chemical industry or power industry from the raw material originally desired for the preparation of mineral oil. According to DE 4,311,034 a liquid fuel or basic material of the chemical industry is prepared from the plastic waste. The main point of this process is that depolymerization products in the gas and liquid phase are prepared in oil as a reaction medium and these products are processed separately. The coke-tar like residue is further utilized by partial hydrogenation. In this process, it is necessary to use a temperature between 250° C. and 450° C. and at a suitable pressure for a reaction time of 0.55 hour. It is evident that, although by means of a process used in the mineral oil processing, a product can be prepared which can be used more easily and generally than the secondary plastic product of low quality described above, however, when adapted to a waste having a broad range of different compositions, neither the composition nor the quantitative ratio of the product fractions become stable. The efficacy of this complicated process is poor, since the amount of products are an order lower than the power and investment costs of the process. Another difficulty is that the ratio of mineral oil used as the reaction medium to the waste is approximately 1:1 and therefore, a very significant quantity of oil should be maintained.

The process according to DE 3,037,829 has a similar target. In this process, after heating a mixture of waste consisting of polyolefins and polystyrene over 300% in anthracene oil, coal tar or in a liquid with similarly low volatility. Olefins and benzene homologues are prepared as products. The residue of the process is also used for a target similar to that of the original tar. A drawback of this process consists therein that a significant amount of high boiling aromatic material is processed and therefore, the reaction mixture should usually be maintained under pressure due to the high temperatures. The ratio of costs to the value of product is also higher in this case.

Japanese publication No. H07-205051 (Appln. No. H05-354767, filing date: Dec. 24, 1993) pertains to a method of reclaiming rubber by a dry process in which the finely powdered waste rubber is heated in a closed vessel and 5 to 30% by weight of a process oil composed of an aromatic oil, a naphtha oil and a paraffin oil, 5 to 20% by weight of an inorganic filler, 5 to 20% by weight of rosin and 1 to 10% by weight of zeolite are added and the rubber particles are processed to obtain a reclaimed rubber. However, recycling rubber in the presence of a composite oil is a technical field different from recycling plastics.

The aim of the present invention is to re-utilize mixed plastic waste by means of an economical process and to prepare a product possessing new properties, which product has a wide range of uses and is different from those existing hitherto.

The invention relates to a process for the conversion of a crushed mixed plastic waste by means of heat treatment and mechanical mixing, and if desired, in the presence of a plasticizer which can be characterized by heating the mixed plastic waste to a temperature between 150° C. and 250° C. in the presence of at least 20% by weight—based on the amount of the plastic waste—of low density polyethylene having a softening point lower than 150° C. and of a mineral oil—5 to 40% by weight based on the amount of the plastic waste and having an open cup flash point higher than 220° C. in a stirring-kneading apparatus exerting intense breaking and shearing forces to the mixture and keeping the period of the intense mechanical-heat treatment in the apparatus until both the rate of power input of the kneading machine and the temperature of the mass become stable and a degradation of the plastic mixture takes place whereby a quasi-homogeneous liquid phase or melt phase material having a bitumen-like appearance is formed.

As low density polyethylene waste, a low density polyethylene film is used preferably which has been subjected to shaping and wear.

The kneading apparatus is preferably a multizone mixing extruder with a spiked roller of the WERNER-PFLEIDERER type (WERNER PFLEIDERER is a trademark) or a "multicat transfermix" transfer type equipment. However, a BANBURY'S mixer (BANBURY is a trade mark) can also be employed, which is coupled with a continuously operating extruder. If desired, the granulated product, usually having a softening point of above 100° C. is, if desired, subjected to grinding in a PRALL-type (PRALL is a trademark) or other grinding machine until a particle size lower than 10 mm is attained. The structure of the granular product obtained is not spheroidal but arborescent.

On carrying out the process according to the invention, the mixed plastic waste, which is a mixture of various polymers is heat-treated in such a way that the highest temperature of heat treatment is lower than the pyrolysis temperature of the mixture.

The decomposition occurring under effect of heat treatment and the starting temperature thereof depends on the one hand on the chemical composition and structure of the mixture and on the other hand, on the sites of faults incorporated during the manufacture of the individual plastics, which are accompanied by the molecular damage induced by mechanical, chemical or photochemical influences occurring during wear. At least 20% by weight of the starting plastic mixture should consists of a plastic waste having a low softening point, which had been subjected to product shaping and wear. Such material suffer pre-degradation and it provides the reactive radicals or ionic molecular sites, respectively, branchings and double bonds necessary for the conversion of the mixed plastic waste in the process and therefore, it induces further degradation at a lower temperature. The additive of the starting material employed can also be considered to be a degradation initiator but simultaneously, it forms the melt or the liquid phase of the starting reaction, respectively. A low density polyethylene film or any other form of low density polyethylene can be employed as such an additive.

Originally the mixed plastic waste is a loose aggregation of torn cut or ground plastic particles having low thermal conductivity. A mineral oil, which can be, e.g. a spent oil having small volatility and an open-cup flash point of at least 200° C. is added in order to promote the further processing and homogenization, to improve kneadability and to achieve the colloidal state of the process material. The added oil is either mixed with the waste or is separately fed into the apparatus. Preferably the flash point of the oil exceeds the highest temperature of the process. An amount of oil of 5 to 6% by weight calculated on the starting material mixture is moistening the material, improves its cohesion and heat transmission, i.e. the formation of a melt phase from particles having low softening points. In the melt phase, the reaction of the total starting material mixture starts and becomes homogenized with the other part of material at "melting" and before attaining the softening point. The quantity of oil additive used is determined by the grade of oil uptake capacity of the starting material mixture. Under the given conditions of the process, the oil additive undergoes a thermooxidative degradation to a small extent, similar to the plastic material.

Experience shows that the amount of oil additive may be 15 to 25% by weight, preferably 5 to 10% by weight where its softening effect already prevails. The material quality of the oil additive is not critical since in the case of oils, which can be taken into account, the properties of adhesion and heat conduction are nearly the same; it is important to maintain the lower limit of flash point. An important condition of the process of the invention is to control the temperature values of heat treatment: the lower limit is at least 115° C. and should not be higher than 250° C. in any case. At a temperature below 115° C. the reaction does not start at a suitable rate and the formation of homogeneity starting with softening is extraordinarily slow even in the presence of an oil additive. At a temperature above 250° C., the pyrolysis is starting with the emission of gas and toxic decomposition products formed.

In addition to the adjustment of composition of the starting material mixture, time of heat treatment and feeding of the oil additive, the intense mechanical kneading and moulding are also indispensable from the point of view of progress of the reaction. The melt should be maintained under constant stirring during the progress of the reaction, since the stirring and kneading contribute to the degradation of the viscous mass. Stirring and kneading do not induce such high shear stress which alone could induce a significant chain breaking by eliminating the bond energy of polymers; however, it contributes to a great extent to increase the rate of the chemically initiated reaction and to considerably promote the intramolecular chain transfer reactions in the polymerization proceeding concurrently with the degradation by mechanical stress.

By kneading the material mixture in the molten medium during the process the remaining material particles with a high softening point are transformed to microgel particles and they can uniformly be subdivided in the dispersing medium having a lower softening point. This process can be accelerated by increasing the extent of degradation but this is promoted only to an extent by which a stable colloid substance with high dispersity grade is formed from the plastic mixture.

On carrying out the process of invention, at the beginning of the process, the stirring-kneading apparatus should be heated up to the temperature stated and the starting plastic mixture should be crushed to such extent that the apparatus can be stirred during the time of heating. After being filled with the material and after partial melting the apparatus exerts a very significant shear force which is necessary to the formation of a colloidal material system.

The colloidal systems transformed from the mixed plastic waste by using the process according to the invention are similar to the bitumens or asphalts, from the point of view of rheological and many other viewpoints since asphalts are colloids wherein asphaltene microgel dispersed particles are divided in an oily medium and the colloidal system is stabilized by so-called petroleum resins.

As a result of the process, in the end product obtained the oil and the plastic material with low softening point perform the role of the oily dispersing medium; the materials with higher softening points perform the role of asphaltene; and the degradation products as well as non-thermoplastic resins and dust-like contaminations of the waste perform the role of a stabilizer. From the aforesaid, it can be concluded that the composition and contaminants of a given waste determine the technological parameters which are required to convert a plastic waste of varying compositions for the preparation of a bitumen-like material under the given conditions.

The stability of physical condition of the bitumen-like material can be presumed to be the result of reactive molecules originating from different materials that are capable to undergo a reaction with each other and thereby a degradation and polymerization or copolymerization, respectively, simultaneously proceed, which promote the establishment of a transient layer at the surface of the very finely crushed particles.

By using the process of the invention, a bitumen-like material is obtained from a mixture of the different plastics in each case; therefore, the colloidal state as a transition state always precedes the radical pyrolysis in the case of processing of plastic mixtures. Of course, the softening point, ductility and other properties of the product are dependent upon the substances introduced and the technological parameters employed. The particles being present in the macroscopically and microscopically homogeneous mass become homogenized. The black or dark color of the product also indicates that the plastic mixture has been degraded concurrently with a decrease in the hydrogen content. Compared with the traditional bitumen this "synthetic" bitumen possesses also more advantageous properties, which positively promote their practical utilization. First, the fact should be mentioned that the product is free of a number of ingredients causing toxic emission, that is, their heating or incineration do not cause an emission in relation with sulfur compounds or originating from carcinogenic polyaromatic substances. The technological properties of the product are preferred on many fields, e.g. it has no cold-flowing property, therefore it is an ideal joint filler material.

The process according to the invention can be carried out in an apparatus operating either discontinuously or continuously. It is essential that the intensity of kneading should be sufficient for the dispersing in addition to keeping the operation periods and temperatures. By carrying out the operation discontinuously, it can be observed that the resistance of medium of the mixture increases very significantly at the beginning and this lasts until the dispersed partially molten or softened particles are prevalent. After a few minutes, the resistance of the particles of average mass is decreasing, then becomes stable, which can be established, on the one hand, from the stabilization of the rate of power input of the machine, and on the other hand, from the stabilization of the temperature of the mass. The properties of the obtained product also becomes stable; no further essential change was observed. Thus, the process according to the invention is carried out in such a way that the mixture is kneaded until both the rate of power input of the kneading machine as well as the temperature of the mass stabilizes.

The process according to the invention can be carried out by means of several known stirring-kneading (moulding) apparatus used in the plastic processing; most preferably using a machine containing intense shear and breaking blades and surfaces, which is capable of producing the compression and shear of the difficultly compatible waste scraps together as well as the intense stirring with the melt or oil playing the role of a dispersion medium but which is also capable to grind the hard and non-thermoplastic resins or contaminants of extraneous materials.

Another advantage of the process according to the invention is that apart from particular cases (e.g. a lot of metal contaminations, much inorganic contaminations, much more oil than the adhered oil amount, etc.), washing and pre-cleaning of the plastic waste of communal or industrial origin involving significant costs can be omitted.

Carrying out the process in practice is illustrated in the following Examples. However, the scope of utilization of the process according to the invention is much broader, consequently the scope of protection is not limited by the Examples.

EXAMPLE 1

A coarsely pre-crushed waste (maximum grain size is 5 to 15 cm) originating from selective waste collection of the population is finely crushed in a chopper with blades in such a way that the granules become less than 10 mm in size. The waste mixture possesses the following composition (expressed as % by weight):

| | |
|---|---|
| low density polyethylene | 47% |
| high density polyethylene | 24% |
| polypropylene | 13% |
| polystyrene | 8% |
| PVC | 5% |
| unidentifiable material | 3% |

The solid material was stirred with 27% by weight of a so-called base oil which is an uncompounded mineral oil with an open cup flash point above 230° C. for the preparation of various lubricating oil and oil used for the industry. The stirring was carried out in such a way that the oil uniformly coated the surface of the waste particles. In this state the mixture could be easily treated, stored and introduced into the reactor by means of a screw feeder.

The mixture was added in portions into a pre-heated twin-screw kneading-moulding reactor in such a way that the feeding should last for 5 minutes. The reactor has such shaping that in the inside thereof at a height of 10% of the radius of the cylinder from the smooth cylinder jacket tooth extruder, the cross section whereof is trapezoid from side view. A set of teeth arranged on one cylinder fits into the smooth cavity situated between two sets of teeth on the other cylinder. Thus on rotation of the cylinders, the edge of teeth exert a crushing effect and the combination of teeth exert a kneading effect while it presses the material to the smooth jacket of the other cylinder. Since the teeth are not in contact with each other, the apparatus cannot break even in case of relatively big pieces, but the edge of the teeth are capable of shearing a soft or harder material along the edge. After addition of the material, a kneading time of 8 minutes is accomplished, then after the material has turned into a homogenous paste, it is discharged by opening the lower aperture. The material has a uniform black color, good mechanical and binding properties; it is a bitumen-like product.

EXAMPLE 2

A material mixture originating from a mixed waste collection was processed, in which used packaging materials (plastic films, bags, plastic glasses), cable coating residues and hard plastic caps and the like were well recognizable. By subjecting the material to a two-phase (two-step) crushing (grinding and tearing), an aggregation of crushed particles of 0.1–5 mm in size were obtained. The composition thereof determined by a subsequent analysis was as follows (expressed in % by weight):

| | |
|---|---|
| low density polyethylene | 55% |
| high density polyethylene | 8% |
| polyamide | 7% |
| PVC | 8% |
| polystyrene | 4% |
| polyurethane | 6% |
| polypropylene | 5% |
| unidentifiable material | 6% |

The material was treated similarly as described in Example 1 with the difference that 19% by weight of a lubricating oil (so-called "spent" used oil) originating from a car and free of volatile substances was added.

The operation was carried out in a twin-screw continuous extruder of 7 liters of total volume in such a way that after a preheating time of 4 minutes the material gets to the kneading space of the machine at a temperature of 190° C., wherein it remains for 6 minutes and then it was introduced to the granulator of continuous operation through the discharge opening of the apparatus.

EXAMPLE 3

A plastic mixture originating from selective waste collection and having the following composition (as expressed in % by weight) was used:

| | |
|---|---|
| polyethylene (LDPE and HDPE) | 70% |
| polypropylene | 15% |
| polystyrene | 5% |
| PVC | 2% |
| others | 6% |

The material was crushed to particles of 2 to 5 cm size in a chopper with blades, then uniformly mixed with an amount of 15% by weight of a mineral oil having a flash point above 220° C. An amount of 50 kg of this mixture was added into a BANBURY-type mixture preheated to 140° C. During this addition, the power consumption of the machine rapidly increased and the temperature of the material increased up to a temperature of 195° C. to 205° C. The machine attained the highest temperature within 3 minutes after the addition which lasted for 12 minutes. Thereafter the power consumption of the machine decreased about to its half value and the temperature of the material decreased to 185° C. The kneading was continued under unchanged conditions for 1 to 2 minutes then, after stabilization, the easily flowing-out bitumen-like mass was discharged from the machine and introduced into an extruder possessing water-cooled cutting head for granulation.

EXAMPLE 4

A plastic mixture having the following composition (expressed in % by weight) was processed according to the process of Example 3:

| | |
|---|---|
| polypropylene | 12% |
| polyamide | 0.4% |
| polyethylene + contaminations up to | 100% |

The mass obtained had a softening point starting above 100° C. and a well defined softening point at 143° C. The material granulated was ground in an extruder at environmental temperature to particle size of between 0 to 2.5 mm size. The ground material particles obtained had an arborescent shape and were not sticking together.

I claim:
1. A process for the conversion of a crushed mixed plastic waste by means of heat treatment and mechanical mixing, optionally in the presence of a plasticizer, said process comprising heating a crushed mixed plastic waste starting mixture to a temperature between 150° C. and 250° C. in the presence of at least 20% by weight—based on the amount of the plastic waste—of low density polyethylene having a softening point lower than 150° C. and 5 to 40% by weight—based and on the amount of the plastic waste—of a mineral oil having an open cup flash point higher than 220° C. in a stirring-kneading apparatus, exerting intense breaking and shearing forces while heating, to the mixture and keeping the period of intense heat and mechanical treatment in the apparatus until both the rate of power input of the kneading machine and the temperature of the mass become stable and a degradation of the plastic mixture takes place whereby a quasi-homogeneous liquid phase or melt phase product is formed in a colloidal state.

2. The process according to claim 1, wherein the mixed plastic waste starting mixture is heated gradually to the temperature of the intense heat treatment being between 150 to 250° C.

3. The process according to claim 1, wherein the low density polyethylene has been subjected to shaping and wear.

4. The process according to claim 3, wherein the low density polyethylene is in the form of a film.

* * * * *